United States Patent Office 2,931,767
Patented Apr. 5, 1960

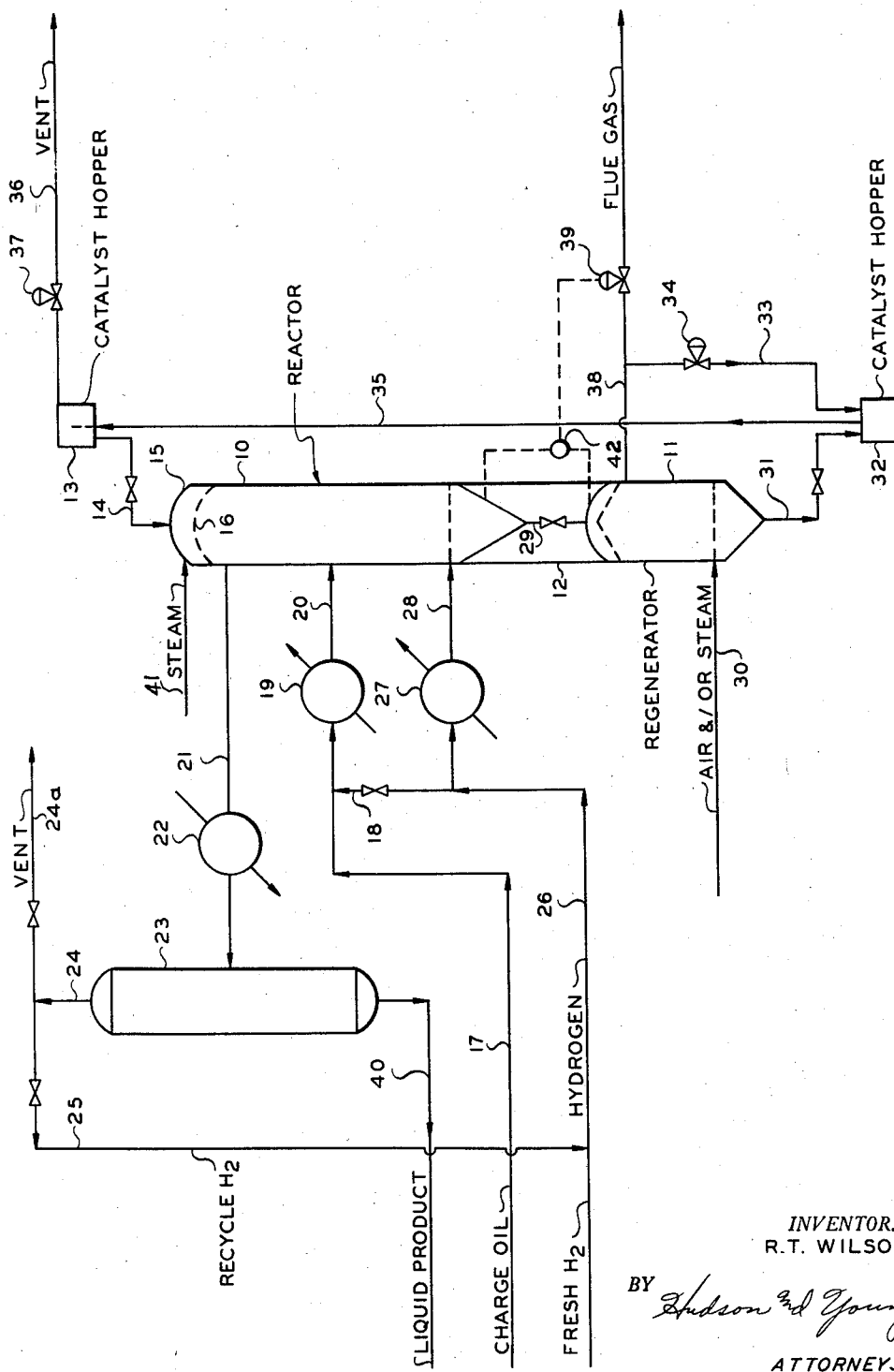

2,931,767

GRAVITATING BED CATALYTIC HYDROCRACKING PROCESS

Reagan T. Wilson, Bartlesville, Okla., assignor to Phillips Petroleum Company, a corporation of Delaware Application November 14, 1955, Serial No. 546,630

5 Claims. (Cl. 208—68)

This invention relates to a process for the hydrocracking of petroleum residues and other heavy hydrocarbons to produce lighter hydrocarbons including those boiling in the gasoline range.

Destructive hydrogenation of high boiling hydrocarbons is well known. Conversion of such materials can be satisfactorily accomplished in this manner, but it requires rather high pressures of the order of 3000 p.s.i. or more. There are compelling economic reasons for employing low pressures. Also, the products obtained by such high pressure treatment are usually of inferior quality. Attempts to use lower pressures, in general, have been unsatisfactory due to the fact that carbon deposition is greatly increased. The hydrocracking process is usually carried out in a static bed reactor, but this method of operation has not proved entirely satisfactory when attempting to obtain complete conversion of high boiling hydrocarbon fractions to distillates and coke.

Therefore, it is a principal object of this invention to provide an economically feasible continuous process for the complete conversion of high boiling hydrocarbons by hydrocracking to lower boiling products and coke at moderately low pressures. Another object is to provide a hydrocracking process for converting petroleum residues to lighter hydrocarbon fractions and coke. A further object of the invention is to provide a process for hydrocracking heavy hydrocarbons to lighter fractions in two stages in a single reactor wherein more severe conditions favorable to converting the heavier materials are maintained in the second stage. Other objects of the invention will become apparent from a consideration of the accompanying disclosure.

The invention comprises introducing a preheated charge oil, together with hydrogen if desired, to an intermediate point of a reactor in which a gravitating bed of hot hydrocracking catalyst is maintained, introducing a hot hydrogen-containing gas at the bottom of the reactor so as to pass the same upwardly countercurrently to the liquid portion of the charge oil and catalyst in the lower section of the reactor, removing from the top of the reactor hydrocarbon vapors produced in the lower portion of the reactor and initially present in the feed by the stripping action of the countercurrently flowing hydrogen, and passing the hydrocarbon vapors and hydrogen to a liquid-gas separator for separation of hydrogen and normally gaseous hydrocarbons from the normally liquid portion of the effluent. The coke-covered catalyst is withdrawn from the bottom of the reactor and regenerated in conventional manner, the regenerated catalyst being returned to the reactor to form the moving bed catalyst. The liquid fraction from the separator is subjected to fractionation to recover a gasoline fraction, a diesel oil fraction, and a gas oil fraction which is suitable for catalytic cracking.

According to the invention, a hydrocracking process is carried out using a granular or pelleted catalyst that flows downwardly in the reactor by gravity and forms a solid moving bed of catalyst therein, coke covered catalyst being continuously withdrawn from the reactor, regenerated, and the regenerated catalyst being returned to the reactor. Heated charge stock together with hydrogen, if desired, is introduced at an intermediate point in the reactor, and heated hydrogen is introduced at a point in the lower section of the reactor, preferably at the bottom. The charge stock is partially vaporized upon initially contacting the catalyst. The unvaporized portion passes downwardly concurrently with the catalyst and in countercurrent flow to the hydrogen introduced in the bottom of the reactor. Hydrocarbon vapors are formed in the lower section of the reactor and are removed from the top of the reactor by the stripping action of the countercurrently flowing hydrogen. The remainder of the liquid charge, not converted to vaporous products, is converted to coke and removed with the catalyst and passed to the regenerator. The vapor phase product produced in the lower section of the reactor contacts fresh catalyst in the upper section of the reactor (above the feed point) and is stabilized and desulfurized. Thus, it can be seen that the process of the present invention utilizes the catalyst very efficiently to obtain complete conversion of the residuum to distillates and coke, the more refractory residuum preferably being converted at more severe conditions which would not be desirable in a one-stage, or fixed bed system.

Hydrocracking of the unvaporized portion of the charge stock takes place in the lower section of the reactor to produce high quality distillates simultaneously with stabilization and desulfurization of the vaporized portion of the charge stock in the upper section of the reactor. Products produced in the process of the present invention include normally gaseous hydrocarbons, gasoline, diesel fuel, light and heavy gas oils, and coke. The gas oil fraction is desirably subjected to catalytic cracking to increase the production of gasoline from the original feed.

Examples of suitable feed stocks that can be treated according to the present invention include crude petroleum, reduced or topped crude, high boiling tarry fractions, heavy gas oils, vacuum residuums, and other heavy fractions. A preferred feed stock comprises a fraction having an initial boiling point in the range of about 600 to 850° F. In general, the pressure utilized in the reactor may range from 200 to 1000 p.s.i.g., preferably from about 400 to 700 p.s.i.g., with the temperature in the range of 650 to 950° F., preferably 800 to 900° F., in the upper section of the reactor, and 800 to 1100° F., preferably 850 to 1000° F. in the lower section of the reactor. The temperature in the lower section of the reactor is at least 50°, and preferably 100° F., higher than in the upper section to effect the required cracking and conversion. The feed rates may vary widely, but are generally in the range of 0.5 to 4 volumes feed per volume catalyst per hour. The total amount of hydrogen charged to the reactor may range from about 500 to 15,000 cubic feet per barrel of fresh oil charged. Examples of suitable catalysts that may be used in the invention are nickel, cobalt, and iron as metals and/or oxides, nickel tungstate, cobalt molybdate, chromium, molybdenum and tungsten oxides or sulfides, etc. These catalysts are generally distributed on, or otherwise composited with a porous carrier such as activated alumina, silica-gel, silica-alumina cracking catalysts, etc.

Better understanding of my invention will be obtained by reference to the accompanying diagrammatic drawing.

The apparatus in which the process is carried out comprises a reactor 10 and a regenerator 11 which may be built into a single tower 12. Catalyst is fed by gravity from an upper catalyst hopper 13 by line 14 into catalyst distributing head 15 which comprises a catalyst feed tray 16. A petroleum residue charge stock in line 17, such as reduced crude oil having an initial boiling point in the range of 700 to 850° F., together with fresh and recycled hydrogen introduced by line 18 is passed to preheater 19, heated to an elevated temperature preferably in the range of 800 to 925° F., and passed through line 20 to an intermediate point in the reactor. The unvaporized portion of hydrocarbon feed and catalyst pass concurrently downwardly through the reaction zone 10, the vaporous product and excess hydrogen being removed at the top of the reactor and passed through line 21 to a cooler 22 and a liquid-gas separator 23. An overhead stream rich in hydrogen and containing some light hydrocarbons is removed from separator 23 through line 24 for recycle through line 25 to reactor 10, or for other use, in part or in whole, through line 24a. A liquid product stream comprising gasoline and distillates is removed from separator 23 through line 40 for further processing. Also, entering reactor 10 is the remaining portion of fresh and recycled hydrogen supplied through line 26, preheated in heater 27 to a temperature in the range of 900 to 1000° F., and passed through line 28 to the bottom of reactor 10. The reaction in the upper section of the reactor is in vapor phase and reaction in the lower section is in mixed phase. In the lower section of the reactor, the hydrocarbon and hydrogen are contacted in countercurrent flow and in the upper section their flow is concurrent. A small quantity of steam is injected into the top of reactor 10 by line 41 to seal the catalyst feed line 14 and prevent the escape of hydrocarbon vapors and hydrogen into the hopper 13.

The coke coated catalyst is fed by gravity through line 29 into regenerator 11. Air and inert gas, or superheated steam, is injected into the regenerator by line 30 so as to burn off the coke and other deposits on the catalyst in known manner. Temperatures within the regenerator are controlled by varying the air flow and also by means of a cooling system (not shown) located within the regenerator. The regenerated catalyst flows by gravity from the regenerator through a seal leg 31 to a lower catalyst hopper 32. Here the catalyst is picked up by a stream of flue gas introduced into the hopper 32 by line 33 and flow controller 34, and lifted to the upper catalyst hopper 13 by line 35, from which the flue gas is vented by line 36 and flow controller 37, the catalyst being fed back into the reactor. The flue gas leaving the regenerator by line 38 is split into two streams, one stream passing by line 33 and flow controller 34 into the catalyst hopper 32, and the other stream passing to a vent by a pressure controller 39 regulated by a differential pressure recorder 42 connected to the reactor and regenerator. If desired, compressed air, or a mechanical elevator can be used for elevating the regenerated catalyst to the upper catalyst hopper.

Certain modifications of the invention will become apparent to those skilled in the art and the illustrative details disclosed should not be construed as imposing unnecessary limitations on the invention.

I claim:

1. A process for converting high boiling hydrocarbons to lower boiling hydrocarbons and coke by hydrocracking, comprising maintaining a gravitating bed of hot solid particulate hydrocracking catalyst in a reaction zone; introducing a hydrocarbon feed having an initial boiling point in the range of 600 to 850° F. to said bed at an intermediate section of said reaction zone, whereby a vaporized fraction of said feed passes upwardly in said reaction zone from the point of introduction in countercurrent flow to said catalyst at a reaction temperature in the range of 650-950° F. so as to improve the quality of said vaporized fraction and a substantial liquid fraction of said feed, boiling above the temperature in said reaction zone above the feed inlet, passes downwardly in said reaction zone concurrently with said catalyst; introducing a stream of hydrogen, at a temperature above that in said reaction zone above the feed inlet, into a lower section of said reaction zone below the feed inlet so that said hydrogen flows countercurrently to said liquid feed and to said catalyst through the reaction zone and maintains a temperature in said reaction zone below the feed inlet in the range of 850° to 1100° F. and at least 100° F. above that maintained in the reaction zone above the feed inlet; maintaining hydrocracking conditions at least in the lower zone so as to convert a substantial portion of said liquid fraction to lighter hydrocarbons and to coke; and recovering a gaseous effluent comprising products of the upper and lower sections of said reaction zone and hydrogen from an upper portion of the upper section of said reaction zone.

2. The process of claim 1 including feeding 500 to 15,000 cubic feet of hydrogen to said reaction zone per barrel of hydrocarbon feed.

3. The process of claim 1 including the steps of transferring catalyst from said lower section to a burning zone; regenerating said catalyst in said burning zone by burning the coke therefrom at a temperature above about 1000° F. but below that at which substantial deterioration of said catalyst occurs; and transferring the regenerated catalyst substantially at the temperature resulting from regeneration to the upper section of said reaction zone.

4. A process for hydrocracking a reduced crude oil fraction having an initial boiling point in the range of 700 to 850° F. to hydrocarbons boiling in the gasoline range comprising heating said fraction to an elevated temperature and feeding same together with hydrogen to an intermediate section of a bed of hot solid particulate hydrocracking catalyst gravitating through a reaction zone, the temperature of said catalyst and feed being regulated so as to maintain a reaction temperature in the upper section of said reaction zone above the point of introduction of feed in the range of 650 to 950° F. and effect vapor phase conversion of a substantial portion of said feed to hydrocarbons boiling in the gasoline range, a remaining portion of said feed in liquid form passing to the lower section of said reaction zone; feeding a hot stream of hydrogen-containing gas at an elevated temperature and in sufficient quantity to the lower portion of said lower section to maintain therein a reaction temperature in the range of 850 to 1100° F. and substantially higher than the temperature maintained in said upper section so as to substantially completely convert said remaining portion to lighter hydrocarbons and coke; withdrawing a gaseous effluent from an upper level of said upper section of the reaction zone comprising reaction products and hydrogen from both said upper and lower sections; and recovering hydrocarbons boiling in the gasoline range from said effluent.

5. The process of claim 4 including the steps of withdrawing coked catalyst from the lower end of said lower section and transferring same to a burning zone; burning coke from said catalyst at a temperature below that at which substantial deterioration of the catalyst occurs; and transferring the hot regenerated catalyst to said upper section.

References Cited in the file of this patent

UNITED STATES PATENTS

| | | |
|---|---|---|
| 2,415,998 | Foster | Feb. 18, 1947 |
| 2,499,304 | Evans | Feb. 28, 1950 |
| 2,662,846 | Montgomery et al. | Dec. 15, 1953 |
| 2,689,821 | Imhoff et al. | Sept. 21, 1954 |
| 2,719,114 | Leffer | Sept. 27, 1955 |
| 2,738,307 | Beckberger | Mar. 13, 1956 |
| 2,758,059 | Berg | Aug. 7, 1956 |
| 2,798,029 | Eastwood | July 2, 1957 |